United States Patent
Wolf

Patent Number: 5,592,384
Date of Patent: Jan. 7, 1997

[54] RAILWAY BRAKE SYSTEM TESTER

[75] Inventor: Daniel J. Wolf, Pittsburgh, Pa.

[73] Assignee: Westinghouse Air Brake Company, Wilmerding, Pa.

[21] Appl. No.: 403,385

[22] Filed: Mar. 14, 1995

[51] Int. Cl.$^6$ ................................................. B60T 17/22
[52] U.S. Cl. .............. 364/424.024; 73/121; 364/424.034
[58] Field of Search ............................... 364/426.05, 550, 364/551.01, 424.03, 424.04; 73/121

[56] References Cited

U.S. PATENT DOCUMENTS

| | | | |
|---|---|---|---|
| 4,440,015 | 4/1984 | Hann | 73/39 |
| 4,847,770 | 7/1989 | Kane et al. | 364/426.05 |
| 5,201,834 | 4/1993 | Grazioli et al. | 246/169 R |
| 5,315,520 | 5/1994 | Drake et al. | 364/426.05 |
| 5,509,727 | 4/1996 | Hart et al. | 303/3 |

*Primary Examiner*—Michael Zanelli
*Attorney, Agent, or Firm*—James Ray & Associates

[57] ABSTRACT

A railway vehicle brake system tester for performing at least one test procedure on an electronically controlled railway vehicle brake system disposed on a railway vehicle without requiring removal of such electronically controlled brake system from such railway vehicle which includes a mounting member for mounting a number of predetermined components of such railway brake system tester thereon. A microprocessor unit is disposed on such mounting member and is connected to receive and communicate information required for performing such at least one test procedure. Another device is disposed on such mounting member and is connected for receiving preselected outputs from such brake system and is connected to communicate such preselected outputs to such microprocessor and is connected to receive preselected inputs from the microprocessor and is connected to communicate such preselected inputs to such brake system. Still another device is disposed on such mounting member which is connected for communicating at least one pressure acquisition signal to such microprocessor.

20 Claims, 4 Drawing Sheets

RAILWAY BRAKE SYSTEM TESTER

FIELD OF THE INVENTION

The present invention relates, in general, to electronically controlled braking systems which at the present time are used being rather extensively on various types of railway vehicles and, more particularly, this invention is related to an electronically controlled railway brake system test apparatus for performing the tests required on such electronically controlled braking systems. Still more specifically, the present invention is related to a railway brake system testing apparatus which can be readily connected to an electronically controlled brake system disposed in the cab portion of a freight-type railway locomotive without the requirement that such electronically controlled brake system to removed from the cab portion of such railway locomotive prior to performing such tests.

BACKGROUND OF THE INVENTION

Electronically controlled railway vehicle-type brake systems, as is generally well known in the art, have been in widespread use in the passenger transit-type railway industry for several years. More recently, however, these electronically controlled railway vehicle brake systems as well as a number of other electronic-type control systems have been installed on the modern freight-type railway locomotives in order to provide improvement in not only the performance of such brake systems but also the reliability of these brake systems.

Such modern-day locomotive electronic controls, which includes the locomotive brake control systems, will normally have state of the art computer technology incorporated therein. Such computer technology enables both a reduction of the extensive hardware requirements and it will more easily facilitate the adaptation of the different electronically controlled systems to various customer requirements.

In one such electronically controlled brake control system, which is illustrated and described in U.S. Pat. No. 5,222,788 and assigned to the same assignee as the present invention, there is provided a cab-mounted, handle-operated brake controller assembly. Such handle-operated brake controller assembly will output the desired brake command electrical signal to a microprocessor unit. Such microprocessor unit, in this particular brake control system, will then interpret the brake command electrical signal received in terms of a feedback signal. This feedback signal is representative of the air pressure contained in an equalizing reservoir of such brake system. After this feedback signal is received, such microprocessor unit will then effect an appropriate operation of the application and release electropneumatic valves in order to adjust the equalizing reservoir air pressure in accordance with the interpretation made of such brake command electrical signal. In another such electronically controlled brake system taught in U.S. Pat. No. 5,332, 297 to Cunkelman et al., there is illustrated and described a microprocessor based locomotive brake control system that features both an electropneumatic brake pipe pressure regulating circuit through which pressure in the brake pipe is controlled and a normally closed charging cutoff valve between that regulating circuit and the brake pipe. The assignee of U.S. Pat. No. 5,332,297 is also the assignee of the present invention. The teachings of U.S. Pat. No. 5,332, 297 are also incorporated herein by reference.

A relatively high-capacity pneumatic relay valve device is employed in this particular electronically controlled brake system so that the trainline brake pipe air pressure can be varied in accordance with the variations of the equalizing reservoir air pressure, in order to control the brakes disposed on the railway cars. This so-called prior art type brake pipe control circuit of the afore-mentioned electronically controlled brake system has been illustrated and described in U.S. Pat. No. 4,904,027, which is likewise assigned to the same assignee as the present invention. The teachings of U.S. Pat. No. 4,904,027 are, likewise, incorporated herein by reference thereto.

The electronic brake control system further includes a locomotive brake cylinder control circuit. Such brake cylinder control circuit includes both electropneumatic application and release valves. The electropneumatic valves, of such locomotive brake cylinder control circuit, are operated by the microprocessor unit in response to changes in brake pipe air pressure initiated by the brake pipe control circuit in accordance with movement by the operator of an automatic brake handle disposed on the cab brake controller unit.

Another relatively high-capacity pneumatic-type relay valve device is provided in this electronic brake control system in order to control the air pressure present in the locomotive brake cylinders in accordance with the pressure output signal of the locomotive brake cylinder control circuit application and release electropneumatic valves.

The electropneumatic valves present in both the brake pipe control circuit and the locomotive brake cylinder control circuit are arranged in such a manner to assume a pressure release state, in the undesirable event of a power loss at the microprocessor unit. As a consequence of such a power loss, therefore, the brake pipe air pressure is reduced while, consequently, the locomotive brake cylinder air pressure is released.

A pneumatic-type back-up control valve device is provided in the railway locomotive automatic brake control circuit in order to establish locomotive brake cylinder air pressure in response to the afore-mentioned reduction of brake pipe air pressure which results from such fail-safe operation of the electropneumatic valves in the brake pipe pressure control circuit, there being a double check valve arrangement provided in order to separate the pneumatic backup control valve device from the electropneumatic valves in the locomotive brake cylinder control circuit.

There are additional electropneumatic valves which are employed in conjunction with a charging cut-off valve device in a branch pipe via which the brake pipe air pressure control circuit is connected to the locomotive brake pipe. The charging cut-off valve device is provided in the system in order to establish the required communication link between the brake pipe air pressure control circuit and the brake pipe when the locomotive is to be set up for a "lead" operation, i.e., as the controlling locomotive, and to interrupt such communication link when the locomotive is to be set up for a "trail" operation, i.e., as a non-controlling locomotive.

The afore-mentioned charging cut-off valve device is a bistable valve and will, therefore, remain in its set position in the event of an undesirable microprocessor unit malfunction that results in a loss of power. In the event such an undesirable malfunction occurs on a controlling "lead" locomotive that is subsequently downgraded to a non-controlling "trail" status, it will be appreciated that the charging cut-off valve device will remain in its previously set open position. Typically, as is known in the railway industry, such a non-controlling locomotive is hauled "dead", i.e., without electrical power. Without such electrical power the application and release electropneumatic valves in the brake pipe air pressure control circuit are obviously de-energized. This condition will in turn cause the relay valve in this control circuit to assume an exhaust condition, thereby venting air pressure from the brake pipe by way of the open charging cut-off valve device. Accordingly, the needed ability to recharge the brake pipe with air pressure from another controlling "lead" locomotive, following a "loss of power" brake application, could be seriously jeopardized.

For a number of reasons, which are believed to be obvious from the above discussion, safety rules and regulations which govern the railway industry dictate that certain critical aspects of these electronically controlled railway vehicle-type brake systems must be tested at least periodically in order to determine that they are in proper working order. Such testing will normally be carried out at the time such freight-type railway locomotive is required to be in the shop for either some necessary repairs or any other routine maintenance requirements.

Prior to the present invention, when such required testing of the electronically controlled railway vehicle brake system was carried out, as is known by applicant, it was necessary for the brake system control unit to be physically removed from the cab of the locomotive prior to testing. However, as will become readily apparent to persons skilled in the railway vehicle braking art from the detailed description of the instant invention, there exists the possibility that certain aspects of this test might not be valid. For example, if the actual fluid pressures which are available to the various pressure communication lines on the locomotive are not at the desired and/or required pressure this undesirable condition may never be recognized when the electronic brake control system has been removed from the locomotive prior to such testing being performed.

SUMMARY OF THE INVENTION

The present invention provides a railway vehicle brake system test apparatus capable of performing at least one predetermined test procedure on an electronically controlled railway vehicle brake system disposed on a railway vehicle. Use of this railway vehicle brake system test apparatus does not require the removal of such electronically controlled railway vehicle brake system from such railway vehicle for the test procedure selected to be carried out. Such railway vehicle brake system tester includes a mounting means for mounting a number of predetermined components of such railway brake system tester thereon. There is a microprocessor unit disposed on such mounting means which is connected in such a manner so as to both receive and communicate certain preselected information required for performing such at least one predetermined test procedure. Another means is disposed on such mounting means which is connected for receiving preselected electrical outputs from such electronically controlled railway vehicle brake system and is connected to communicate such preselected electrical outputs to such microprocessor unit. This means is also connected to receive preselected electrical inputs from such microprocessor unit and is connected to communicate such preselected electrical inputs to such electronically controlled railway vehicle brake system. The final essential element of the railway brake system tester according to the present invention is a means also disposed on such mounting means which is connected for communicating at least one predetermined pressure acquisition signal to such microprocessor unit.

OBJECTS OF THE INVENTION

It is, therefore, one of the primary objects of the present invention to provide a railway vehicle brake system test apparatus which does not require an electronically controlled brake system be removed from the railway vehicle prior to carrying out a test procedure.

Another object of the present invention is to provide a railway vehicle brake system test apparatus which is relatively simple and easy to use.

Still another object of the present invention is to provide a railway vehicle brake system test apparatus which provides a more reliable test result on an electronically controlled railway brake system.

Yet another object of the present invention is to provide a railway vehicle brake system test apparatus which can be manufactured as a portable test apparatus.

A further object of the present invention is to provide a railway vehicle brake system test apparatus which can be provided with the capability of checking not only all of the critical electrical inputs and outputs of the electronically controlled railway brake system, but also certain selected critical fluid pressures.

It is an additional object of the present invention to provide a railway vehicle brake system test apparatus which possesses the capability of testing any undesirable PSI leakage which may be present in the electronically controlled railway vehicle brake system.

Another object of the present invention is to provide a railway vehicle brake system test apparatus which has the capability of performing a desirable preliminary yard/departure test procedure on an electronically controlled railway vehicle brake system.

Still yet another object of the present invention is to provide a railway vehicle brake system test apparatus which can provide protection to personnel during certain testing procedures which would require ear protection, for example.

Yet still another object of the present invention is to provide a railway vehicle brake system test apparatus which is capable of performing test procedures related to a number of preselected safety issues.

A still further object of the present invention is to provide a railway vehicle brake system test apparatus which is capable of performing a handle test of the electronically controlled railway vehicle brake system, with human assistance, but with all other test functions being performed automatically by such test apparatus.

It is an additional object of the present invention to provide a railway vehicle brake system test apparatus which provides a desirable independent source of PSI fluid pressure checks on such electronically controlled railway vehicle brake system.

Another object of the present invention is to provide a railway vehicle brake system test apparatus which may have incorporated therein a capability of providing various test summaries in a number of forms, such as in the form of a screen display and/or as a printout.

Still another object of the present invention is to provide a railway vehicle brake system test apparatus which possesses the capability of specifying either repair or replacement of component parts for such electronically controlled railway vehicle brake system.

Yet another object of the present invention is to provide a railway vehicle brake system test apparatus which will substantially minimize operator time and will require a minimal amount of training to operate.

A further object of the present invention is to provide a railway vehicle brake system test apparatus which, during the test procedure, will substantially minimize the chance for any human error to occur and thereby provide a significantly more reliable test.

Another object of the present invention is to provide a railway vehicle brake system test apparatus which has the capability of shutting itself down in a safe manner in the event of an unsafe condition being detected.

Still another object of the present invention is to provide a railway vehicle brake system test apparatus which will not accept any manual commands which would result in an unsafe condition being encountered.

Yet another object of the present invention is to provide a railway vehicle brake system test apparatus which is capable of performing not only a rack self test procedure but also an automatic calibration procedure.

A still further object of the present invention is to provide a railway vehicle brake system test apparatus which can be utilized as a training aid.

An additional object of the present invention is to provide a railway vehicle brake system test apparatus which provides an increased level and consistency of testing as well as decrease the amount of railway vehicle downtime.

In addition to the numerous objects and advantages of the railway vehicle brake system test apparatus described above, various additional objects and advantages of the present invention will become much more readily apparent to those persons who are skilled in the electronically controlled railway vehicle braking art from the following more detailed description of such invention, particularly, when such description is taken in conjunction with both the attached drawing Figures and with the appended claims.

BRIEF DESCRIPTION OF THE PRESENTLY PREFERRED AND VARIOUS ALTERNATIVE EMBODIMENTS OF THE INVENTION

Prior to proceeding to the considerably more detailed description of the present invention it should be noted that, for the sake of clarity, identical components which have identical functions have been identified with identical reference numerals throughout the several views that have been illustrated in the drawing Figures.

It should also be further noted that even though the invention will be explained in conjunction with an electronically controlled brake system that is disposed on a freight-type railway locomotive, such railway vehicle brake system test apparatus of this invention can be utilized equally as well to perform test procedures on the electronically controlled brake systems that are presently being used on passenger transit-type vehicles and they are considered to be within the scope of the appended claims. Consequently, as used in the specification and claims the term railway vehicle is meant to include both freight-type locomotives and passenger transit-type vehicles.

Figure 1:
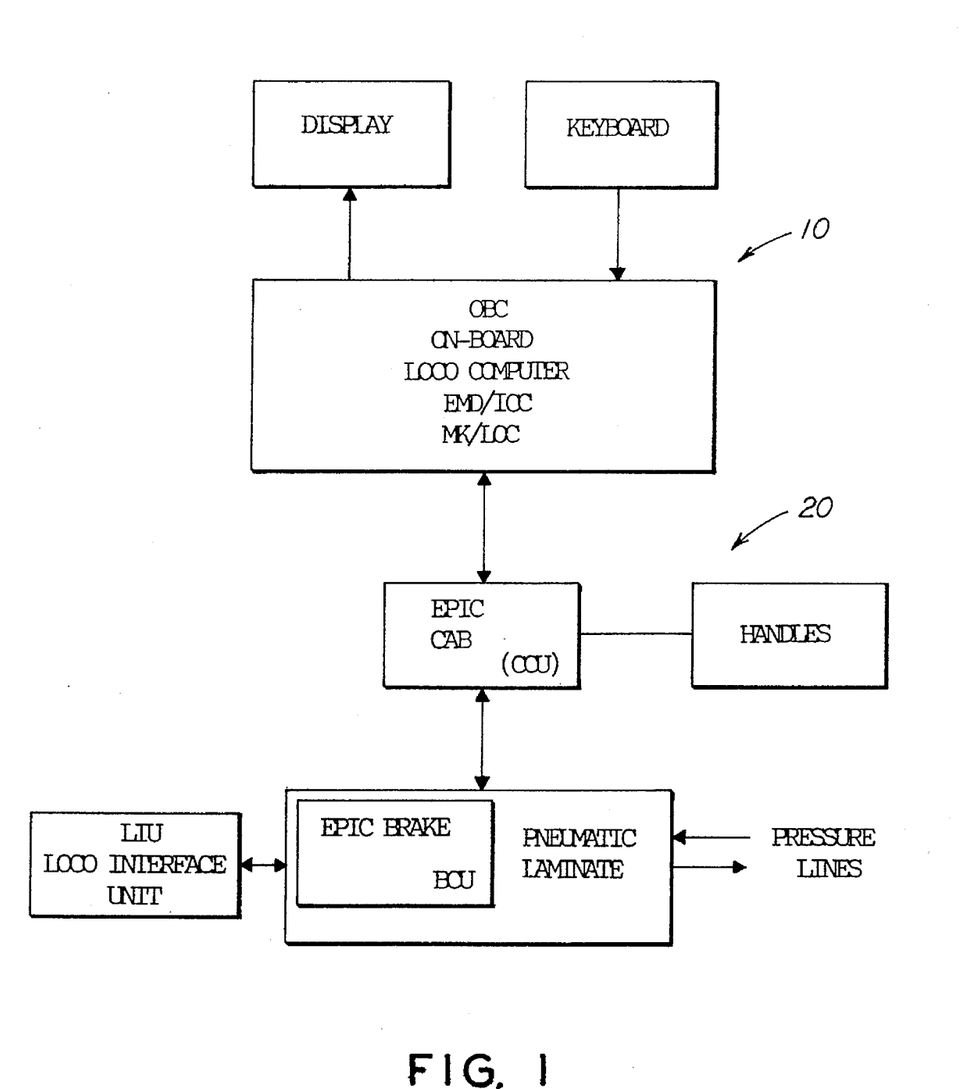
FIG. 1 is a schematic diagram which illustrates a presently preferred embodiment of the instant invention.
Figure 2:
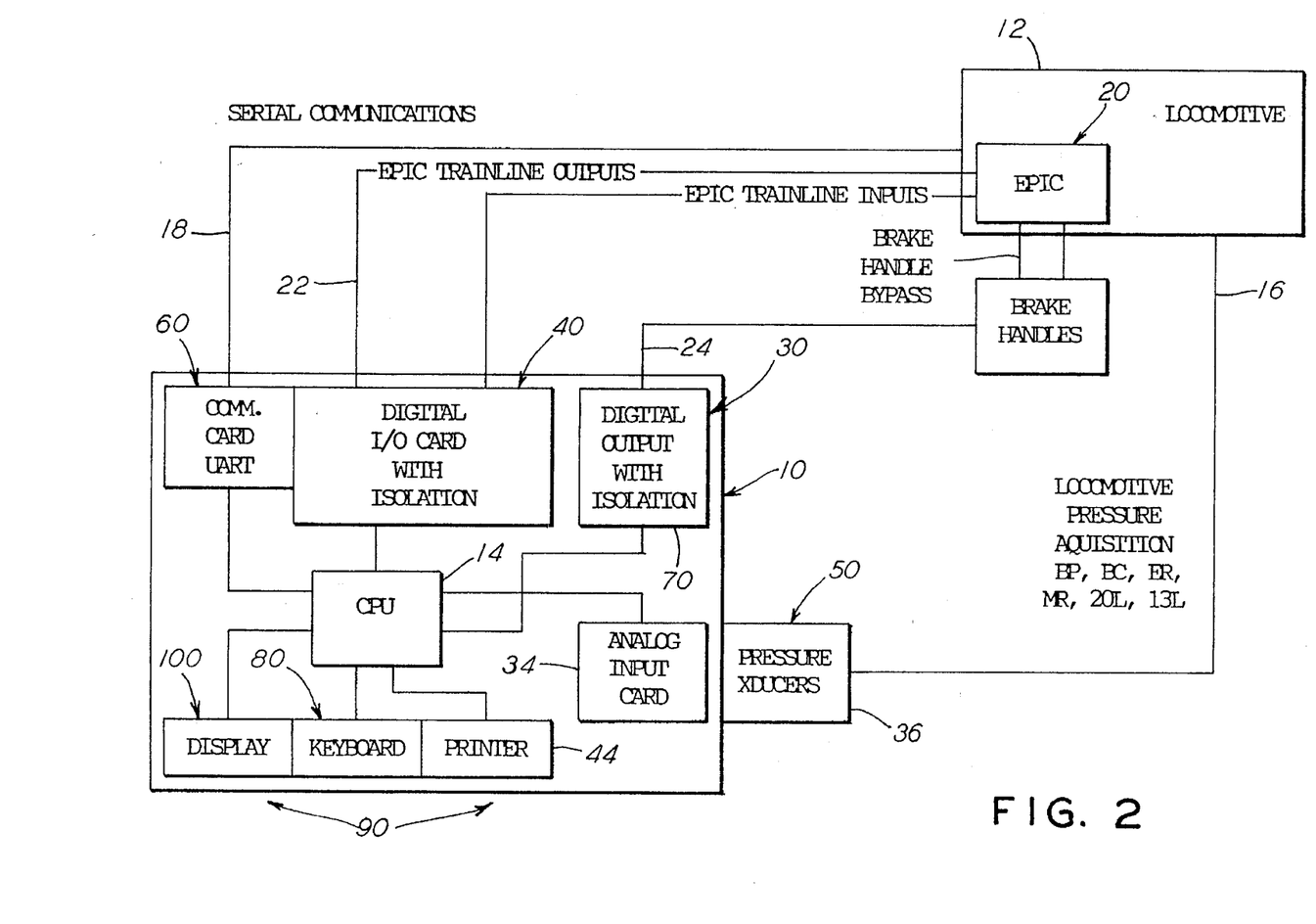
FIG. 2 is a schematic diagram which illustrates one presently preferred type of electronically controlled brake system disposed in the cab portion of a freight-type railway locomotive.

Reference is now made, more particularly, to FIGS. 1 and 2 of the drawings. There is illustrated therein one presently preferred embodiment of a railway vehicle brake system test apparatus, generally designated 10, for performing at least one predetermined test procedure on an electronically controlled railway vehicle brake system, generally designated 20. Such electronically controlled brake system 20 is disposed in the schematically illustrated cab portion 12 of a railway vehicle (not shown).

The at least one predetermined test procedure to be performed can be accomplished with the invented test apparatus 10 without requiring the removal of such electronically controlled railway vehicle brake system 20 from such railway vehicle. Although it is not critical, it is presently preferred that such test apparatus 10 will be equipped in a manner such that it will be more or less portable.

According to the invention, such railway vehicle brake system test apparatus 10 includes a mounting means, generally designated 30, for mounting a number of predetermined components of such railway vehicle brake system test apparatus 10 thereon. In order to make such test apparatus 10 portable it is presently preferred that such mounting means 30 will be a cart-like member disposed on wheels (not shown).

One of these predetermined components is a microprocessor unit 14 disposed on such mounting means 30. The microprocessor unit 14 is electrically connected in a manner for both receiving and communicating certain preselected critical information that will required for performing such at least one predetermined test procedure.

Another one of these predetermined components disposed on such mounting means 30 is a means, generally designated 40, which is connected for receiving certain preselected electrical signals 18 as outputs from such electronically controlled railway vehicle brake system 20 and connected to communicate such preselected electrical signals 18 to such microprocessor unit 14. Such preselected electrical signals 18 are preferably trainline outputs.

Means 40 is further connected to receive certain preselected electrical signals 22 as inputs from such microprocessor unit 14 and is, also, connected to communicate such preselected electrical signals 22 to such electronically controlled railway vehicle brake system 20. Such electrical signals 22 are preferably trainline inputs.

According to one embodiment of the invention, such means 40 disposed on such mounting means 30 and connected for receiving such certain preselected electrical signals 18 as outputs from such electronically controlled railway vehicle brake system 20 and connected to communicate such preselected electrical signals 18 to such microprocessor unit 14 and connected to receive the preselected electrical signals 22 as inputs from the microprocessor unit 14 and connected to communicate such preselected inputs to such electronically controlled railway vehicle brake system 20 is a digital input card (not shown) and a digital output card which are known to practitioners of ordinary skill in the data communication art.

In the presently preferred embodiment of the invention such means 40 which is electrically connected for receiving such preselected electrical signals 18 as outputs from such electronically controlled railway vehicle brake system 20 and is electrically connected to communicate such preselected outputs to such microprocessor unit 14 and electrically connected to receive the preselected electrical signals 22 as inputs from the microprocessor unit 14 and connected to communicate these preselected inputs to such electronically controlled railway vehicle brake system 20 is a combination digital input/output card of a type known to practitioners of ordinary skill in the data communication art.

The final essential component of the test apparatus 10 is a means, generally designated 50, disposed on such mounting means 30 and connected for communicating at least one predetermined pressure acquisition signal 16 to such microprocessor unit 14.

In the preferred embodiment of the present invention, such means 50 disposed on such mounting means 30 which is connected for communicating at least one predetermined pressure acquisition signal 16 to such microprocessor unit 14 includes an analog input card 34 and at least one pressure transducer 36. Such at least one predetermined pressure acquisition signal 16 communicated to the microprocessor unit 14 is at least one of a brake pipe pressure signal, a brake cylinder pressure signal, an equalizing reservoir pressure signal, a main reservoir pressure signal, a 20L pressure signal and a 13L pressure signal. In the most preferred embodiment of the invention, such test apparatus 10 will include a predetermined plurality of pressure transducers 36 and utilize a plurality of pressure acquisition signals 16 to provide a more reliable test.

In the presently preferred embodiment of the invention, such railway vehicle brake system test apparatus 10 further includes a serial communication means, generally designated 60, disposed on such mounting means 30. The serial communication means 60 is connected for communicating electrical signals 18 from such electronically controlled railway vehicle brake system 20 to such microprocessor unit 14 and for communicating electrical signals 22 from the microprocessor unit 14 to such electronically controlled railway vehicle brake system 20. In the presently preferred embodiment of the invention, such serial communication means 60 is a UART communication card of a type known to practitioners of ordinary skill in the data communication art.

Additionally, according to a presently preferred embodiment of the invention, such railway vehicle brake system test apparatus 10 further includes a digital output means, generally designated 70. This digital output means 70 is connected to communicate electrical signals 24 that are representative of the positions of the brake handles 26 from such microprocessor unit 14 to such electronically controlled railway vehicle brake system 20. One advantage of the test apparatus 10 is that it does not require the actual brake handles 26 to be physically repositioned by the person operating such test apparatus 10. Preferably, such digital output means 70 will have an isolation means incorporated therein.

The railway vehicle brake system test apparatus 10, according to a presently preferred embodiment of the instant invention, will further include a means, generally designated 80, for inputting certain preselected information into such microprocessor unit 14. In addition, the railway vehicle brake system test apparatus 10, preferably, will include a means, generally designated 90, for providing summaries to the person who is operating such railway vehicle brake system test apparatus 10.

Preferably, such means 80 for inputting such preselected information into the microprocessor unit 14 is a keyboards. In addition, such means 90 for providing the summaries to an operator of said railway vehicle brake system test apparatus 10 is at least one of a visual display means, generally designated 100, and a printer 44. Such visual display means 100 is preferably a screen. In the most preferred embodiment of the instant invention such means 90 for providing such summaries to the operator of the railway vehicle brake system test apparatus 10 will include both such visual display means 100 and the printer 44.

Figure 3A:
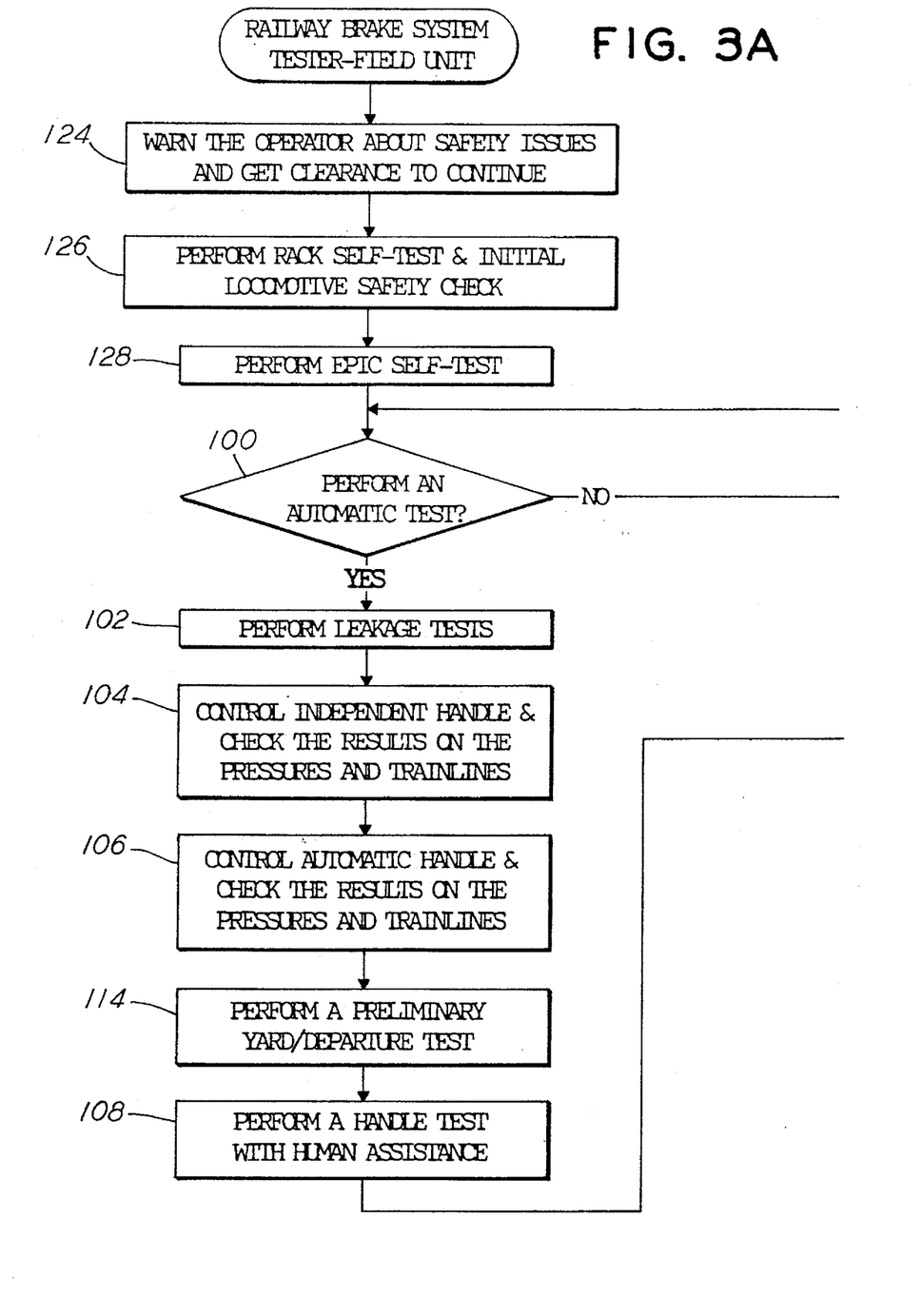
FIG. 3 is a flow chart which diagrammatically illustrates a presently preferred manner of performing at least one predetermined test procedure on a railway brake system and which utilizes the presently preferred test apparatus assembled according to the present invention.
Figure 3B:
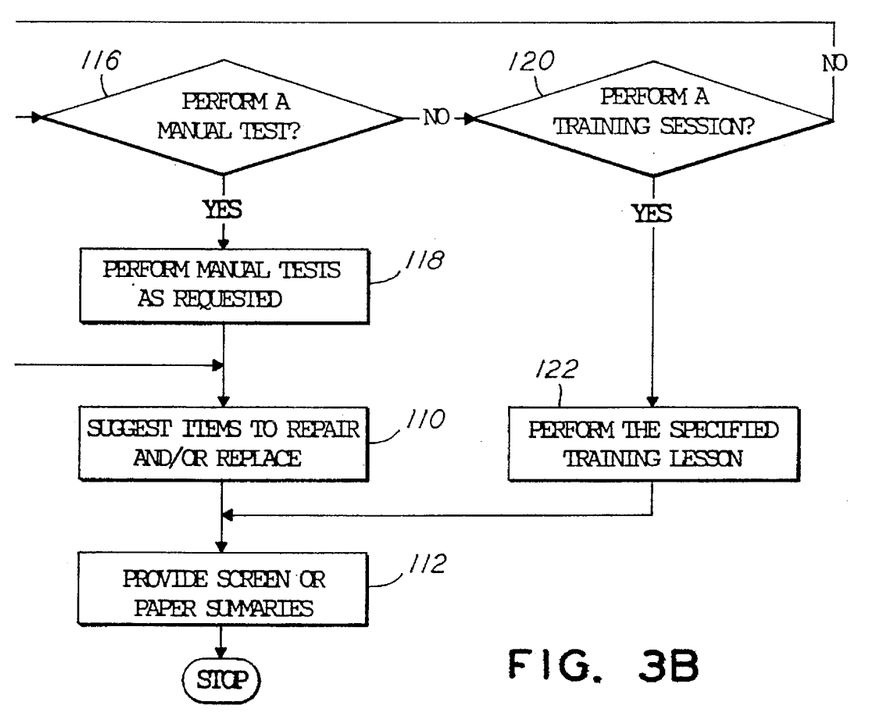

Reference is now directed to FIG. 3. There is schematically illustrated therein a presently preferred sequence of predetermined test procedures to be performed according to the instant invention as well as a number of alternative test procedures which may be performed if desired. Preferably, the test apparatus 10 is set to perform in an automatic mode 100. In this case, such test procedures include testing for leakage 102, control independent handle and check results on pressures and trainlines 104, control automatic handle and check results on pressures and trainlines 106, performance of a handle test with operator assistance 108, suggest items which may need repair and/or replacement 110 and provide screen and/or paper summaries 112. Although not essential, it is presently preferred that the automatic testing will also include performance of a preliminary yard/departure test 114.

Alternatively, the test apparatus 10 of the present invention can be used to perform manual testing 116 if desired. In this case, preselected manual tests 118 are performed as requested by the operator, items needing repair and/or replacement 110 are suggested and summaries 112 are provided to the operator by way of a display screen and/or on paper.

Additionally, the test apparatus 10 may be used to perform operator training sessions 120. Here, certain preselected training lessons 122 are performed and screen and/or paper summaries 112 are provided.

Finally, the test apparatus 10 may be used effectively to warn the operator about preselected safety issues 124 which may require clearance to continue, perform rack self-test and an initial locomotive safety check 126 as well as perform a self-test 128 of the electronically controlled brake system prior to performing the automatic test procedures.

While both a presently preferred and a number of alternative embodiments of the railway vehicle brake system test apparatus have been described in considerable detail above and in conjunction with the attached drawing Figures, it should be readily understood that various additional modifications and/or adaptations of the instant invention can be made by those persons who are skilled in the railway vehicle electronic braking system art without departing from either the spirit of the invention or the scope of the appended claims.

I claim:

1. A railway vehicle brake system test apparatus for performing at least one predetermined test procedure on an electronically controlled railway vehicle brake system disposed on a railway vehicle without requiring removal of such electronically controlled railway vehicle brake system from such railway vehicle, said railway vehicle brake system test apparatus comprising:

(a) a mounting means for mounting a number of predetermined components of said railway vehicle brake system test apparatus thereon;

(b) a microprocessor unit disposed on said mounting means and connected for both receiving and communicating certain preselected information required for performing said at least one predetermined test procedure;

(c) a means disposed on said mounting means and connected for receiving at least one preselected output from such electronically controlled railway vehicle brake system and connected to communicate such at least one preselected output to said microprocessor unit and connected to receive at least one preselected input from said microprocessor unit and connected to communicate said at least one preselected input to such electronically controlled railway vehicle brake system; and (d) a means disposed on said mounting means and connected for communicating at least one predetermined pressure acquisition signal to said microprocessor unit.

2. A railway vehicle brake system test apparatus, according to claim 1, wherein said railway vehicle brake system test apparatus further includes a serial communication means disposed on said mounting means and connected for communicating at least one electrical signal from such electronically controlled railway vehicle brake system to said microprocessor unit and for communicating at least one electrical signal from said microprocessor unit to such electronically controlled railway vehicle brake system.

3. A railway vehicle brake system test apparatus, according to claim 1, wherein said railway vehicle brake system test apparatus further includes a digital output means connected to communicate at least one electrical signal representative of brake handle positions from said microprocessor unit to such electronically controlled railway vehicle brake system without requiring such brake handles to be physically repositioned by an operator.

4. A railway vehicle brake system test apparatus, according to claim 3, wherein said digital output means includes electrical isolation means.

5. A railway vehicle brake system test apparatus, according to claim 1, wherein said railway vehicle brake system test apparatus further includes a means for inputting preselected information into said microprocessor unit.

6. A railway vehicle brake system test apparatus, according to claim 1, wherein said railway vehicle brake system test apparatus further includes a means for providing summaries to an operator of said railway vehicle brake system test apparatus.

7. A railway vehicle brake system test apparatus, according to claim 1, wherein said railway vehicle brake system test apparatus further includes means connected to said mounting means for making said railway vehicle brake system test apparatus portable.

8. A railway vehicle brake system test apparatus, according to claim 7, wherein said mounting means is a cart-like member.

9. A railway vehicle brake system test apparatus, according to claim 1, wherein said means disposed on said mounting means and connected for receiving such at least one preselected output from such electronically controlled railway vehicle brake system and connected to communicate such at least one preselected output to said microprocessor unit and connected to receive such at least one preselected input from said microprocessor unit and connected to communicate such at least one preselected input to such electronically controlled railway vehicle brake system is a digital input card and a digital output card.

10. A railway vehicle brake system test apparatus, according to claim 1, wherein said means disposed on said mounting means and connected for receiving such at least one preselected output from such electronically controlled railway vehicle brake system and connected to communicate such at least one preselected output to said microprocessor unit and connected to receive such at least one preselected input from said microprocessor unit and connected to communicate such at least one preselected input to such electronically controlled railway vehicle brake system is a combination digital input/output card.

11. A railway vehicle brake system test apparatus, according to claim 1, wherein said means disposed on said mounting means and connected for communicating at least one predetermined pressure acquisition signal to said microprocessor unit includes an analog input card and at least one pressure transducer.

12. A railway vehicle brake system test apparatus, according to claim 1, wherein said means disposed on said mounting means and connected for communicating at least one predetermined pressure acquisition signal to said microprocessor unit includes an analog input card and a plurality of pressure transducers.

13. A railway vehicle brake system test apparatus, according to claim 2, wherein said serial communication means is a URAT communication card.

14. A railway vehicle brake system test apparatus, according to claim 5, wherein said means for inputting said preselected information into said microprocessor unit is a keyboard.

15. A railway vehicle brake system test apparatus, according to claim 6, wherein said means for providing said summaries to an operator of said railway vehicle brake system test apparatus is at least one of a visual display means and a printer.

16. A railway vehicle brake system test apparatus, according to claim 15, wherein said visual display means is a screen.

17. A railway vehicle brake system test apparatus, according to claim 15, wherein said means for providing said summaries to an operator of said railway vehicle brake system test apparatus includes both a visual display means and a printer.

18. A railway vehicle brake system test apparatus, according to claim 1, wherein such at least one preselected output from such electronically controlled railway vehicle brake system which is communicated to said microprocessor unit is at least one trainline output.

19. A railway vehicle brake system test apparatus, according to claim 18, wherein such at least one preselected input from said microprocessor unit which is communicated to such electronically controlled railway vehicle brake system is at least one trainline input.

20. A railway vehicle brake system test apparatus, according to claim 18, wherein said at least one predetermined pressure acquisition signal communicated to said microprocessor is one of a brake pipe fluid pressure signal, a brake cylinder fluid pressure signal, an equalizing reservoir fluid pressure signal, a main reservoir fluid pressure signal, a 20 L fluid pressure signal and a 13 L fluid pressure signal.

* * * * *

UNITED STATES PATENT AND TRADEMARK OFFICE
CERTIFICATE OF CORRECTION

PATENT NO. : 5,592,384
DATED      : January 7, 1997
INVENTOR(S) : Daniel J. Wolf It is certified that error appears in the above-identified patent and that said Letters Patent is hereby corrected as shown below:

Column 1, line 9, please delete "used being" and insert --being used--;
column 1, line 17, after "system", please delete "to" and insert --be--.
Column 6, line 36, after "will", please insert --be--;
column 6, line 63, please delete "(not shown)".
Column 8, line 2, please delete "keyboards" and insert --keyboard--.
Column 10, line 27, please delete "URAT" and insert --UART--.

Signed and Sealed this

Twenty-first Day of July, 1998

Attest:

BRUCE LEHMAN

*Attesting Officer*   Commissioner of Patents and Trademarks